United States Patent [19]
Turner et al.

[11] Patent Number: 5,162,658
[45] Date of Patent: Nov. 10, 1992

[54] THERMAL DETECTION ARRANGEMENT HAVING A PLURALITY OF OPTICAL FILTER DEVICES

[75] Inventors: Robert E. Turner, Dorking; Richard A. Ford, Rickmansworth, both of England

[73] Assignee: Thorn EMI plc, London, England

[21] Appl. No.: 688,175

[22] Filed: Apr. 22, 1991

[30] Foreign Application Priority Data

Apr. 20, 1990 [GB] United Kingdom ............... 9008908

[51] Int. Cl.$^5$ .............................................. G01J 7/10
[52] U.S. Cl. .................... 250/554; 250/226; 250/339; 250/342; 340/578
[58] Field of Search ............... 250/554, 226, 339, 340, 250/342, 338.1; 340/578

[56] References Cited

U.S. PATENT DOCUMENTS

| | | | |
|---|---|---|---|
| 3,267,727 | 8/1966 | Benzinger | 250/338.1 |
| 4,035,643 | 7/1977 | Barrett | 250/339 |
| 4,471,221 | 9/1984 | Middleton et al. | 250/339 |
| 4,691,196 | 9/1987 | Kern et al. | 250/339 |

Primary Examiner—David C. Nelms
Assistant Examiner—Que T. Le
Attorney, Agent, or Firm—Fleit, Jacobson, Cohn, Price, Holman & Stern

[57] ABSTRACT

A thermal detector arrangement includes a number of channels, each including a collimator for collimating incident radiation to a respective optical filter. Each optical filter has a respective radiation passband characteristic with one having a passband spanning the passbands of all of the other optical filters. The radiation passed by each optical filter is passed to a thermal detector, which preferably is in the form of a thermally isolating membrane acting as a radiation absorbent cavity and supported by a semiconductor substrate. The output signals from the thermal detectors are multiplexed, amplified by an amplifier having voltage offset compensation and digitally processed to provide an indication of a fire to be sensed.

20 Claims, 5 Drawing Sheets

THERMAL DETECTION ARRANGEMENT HAVING A PLURALITY OF OPTICAL FILTER DEVICES

This invention relates to thermal detection arrangements and it relates more particularly to such arrangements for the detection of fast-onset fires of the kind that can occur as the result of ignition of volatile fuels or other highly flammable material.

In the detection of fast-onset fires, it is vitally important, bearing in mind that a major object of the detection is to initiate the release of rapid-acting extinguishants and/or the taking of other remedial measures, that the detection be effected not only rapidly but also reliably so as to avoid, or at least reduce the risk of, the remedial measures in question being initiated on the basis of a false alarm system.

Prior art detection arrangements used in the foregoing context have tended to be either rapid acting and unreliable but with response times insufficient to enable remedial action to be taken rapidly enough in some circumstances and indeed difficulty arises in providing an arrangement which is both rapid-acting and reliable.

It is an object of the invention to provide an arrangement of the latter kind, despite the aforementioned difficulty.

Accordingly, there is provided a thermal detector arrangement comprising a plurality of optical filter devices each having a respective passband characteristic for transmitting radiation having a wavelength indicative of a characteristic of a fire to be detected, a further optical filter device having a passband characteristic spanning the passband characteristics of the plurality of optical filter devices, a plurality of thermal detector devices, each for receiving radiation transmitted by a respective optical filter device and for providing therefrom an output signal indicative of the radiation transmitted by the optical filter device, a multiplexer circuit for multiplexing the output signals from the thermal detector devices, and signal processing means for processing the multiplexed output signals and for providing therefrom an indication of a fire to be detected.

Preferably, the thermal detector arrangement includes a plurality of collimators for collimating the radiation to be received by the optical filter devices.

Advantageously, each thermal detector device comprises a silicon substrate having an aperture therein, a thermally isolating membrane supported by the substrate and arranged over the aperture, an absorber supported by the membrane, a hot junction in contact with the absorber and a cold junction in contact with the silicon substrate.

In a preferred embodiment each thermal detector device comprises a silicon substrate having an aperture therein, a thermally isolating membrane supported by the substrate, the membrane having a resistive film on one major surface thereof arranged incident to the radiation and a reflector layer on the opposite major surface thereby to provide a radiation absorbent cavity in the membrane.

The reflector layer may comprise gold.

The signal processing means may comprise an amplifier circuit for amplifying the multiplexed output signals from the thermal detector devices, the signal processing means including an offset adjust circuit for compensating voltage offset of the amplifier circuit.

Preferably, the offset adjust circuit comprises an inverting amplifier circuit and an integrating circuit arranged in a feedback loop to the inverting amplifier circuit.

The signal processing means may also comprise a variable gain amplifier circuit, arranged to receive the output signal from the thermal detector device respective to the further optical device, controlled in dependence upon the level of the output signal from the thermal detector respective to the further optical device.

In order that the invention may be clearly understood and readily carried into effect, one embodiment thereof will now be described, by way of example only, with reference to the accompanying drawings of which.

Figure 1:
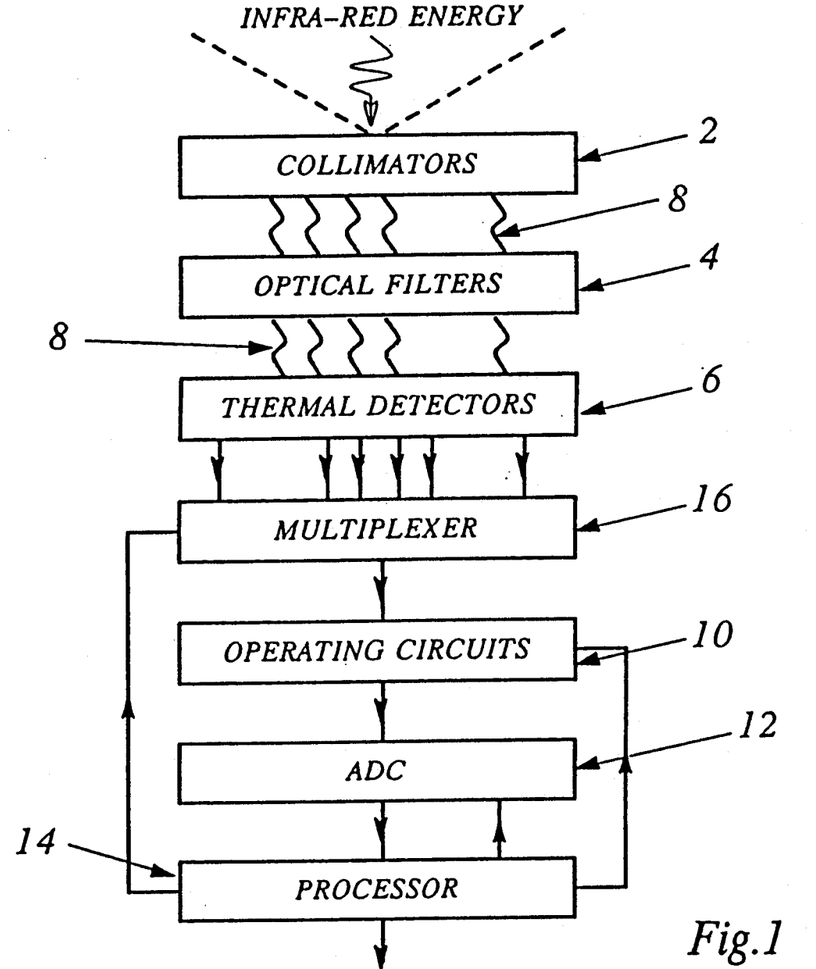
FIG. 1 shows, in block diagrammatic form, an overall arrangement in accordance with one example of the invention.

Referring now to FIG. 1, a thermal detection arrangement comprises a plurality of discrete detection channels, each channel including an input collimating and concentrating device for collimating incident radiation, such as that shown at 2, a filter device such as that shown at 4 and a thermal detector device such as that shown at 6. In this example, there are five active channels shown schematically by channel lines 8, including one "blind" channel used for referencing purposes. It is convenient to fabricate the thermal detector devices 6 in a four-by-two array on a semiconductive substrate, providing eight detector devices. Thus any six of the eight devices of an array can be employed as the thermal detectors for respective of the active channels and the blind channel. This arrangement is efficient because it provides freedom to avoid the use of a defective device by means of a checking and selection procedure carried out when the placement of the filter devices 4 in relating to the thermal detector array is finalised.

Each thermal detector 6 preferably comprises a thermopile of the form shown in FIGS. 4a and 4b, or FIG. 5, and discussed in more detail hereinafter.

As stated above, infra-red energy is allowed to impinge upon each thermopile 6 through a respective optical filter 4 and the characteristics of these filters are selected to take account of the specific nature of the particular kinds of fire which may occur in the environment in question and which the arrangement is intended to detect.

The thermal detector devices 6 generate electrical signals indicative of the absolute amounts of the infra-red energy thereon and/or of changes in such amounts of energy and are repetitively interrogated by an electrical operating circuit 10 to liberate such signals, process the signals in order to improve their signal-to-noise characteristics, for example, and convey the signals via an analogue-to-digital (A to D) converter 12 to a processor circuit 14.

A multiplexing device 16 is provided to enable the various thermal detectors 6 to share a common electrical operating circuit 10 and subsequent circuitry and devices, including the A to D converter 12 and processor circuit 14.

Figure 2:
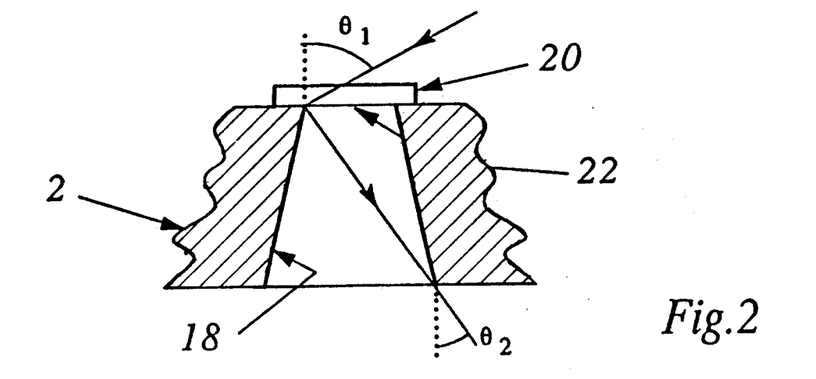
FIG. 2 shows a collimating and angular concentrating device suitable for use in the arrangement of FIG. 1.

Each channel is required to receive infra-red energy incident thereon over a relatively wide angle: an incident angle of 120° is highly desirable. The nature of the optical filters 4 used and in particular their known limitations with regard to their lack of ability to retain their desired selection performance over a wide angle of incidence, as well as limitations upon the physical dimensions of various components in the channels, present difficulties in this respect. According to one aspect of the invention, however, and as shown in FIG. 2, a wide angle of view is retained for the arrangement but the angle of incidence of infra-red radiation upon the optical filters 4 is reduced by the collimating and concentrating devices 2 being configured as shown. Ideally, each such device 2 would have a compound parabolic configuration to its inner surface 18 but in this example, for ease of manufacture, is formed with a frusto-conical inner surface 8. This expedient reduces the incidence angle to 60° (in each channel), shown by $\theta_o$ whilst maintaining sensitivity over an angle of 120°, shown by $\theta_1$.

A sapphire window, shown schematically as window 20, of conventional kind covers the entrance apertures 22 of the devices 2.

The five optical filters used, one for each channel, are chosen with the aim of rendering the overall detection arrangement highly sensitive to the characteristics of fires of the kind it is intended to detect and to discriminate against similar characteristics that might be detected in the same environment but which are not alarm-worthy, i.e. to minimise false alarms.

Figure 3:
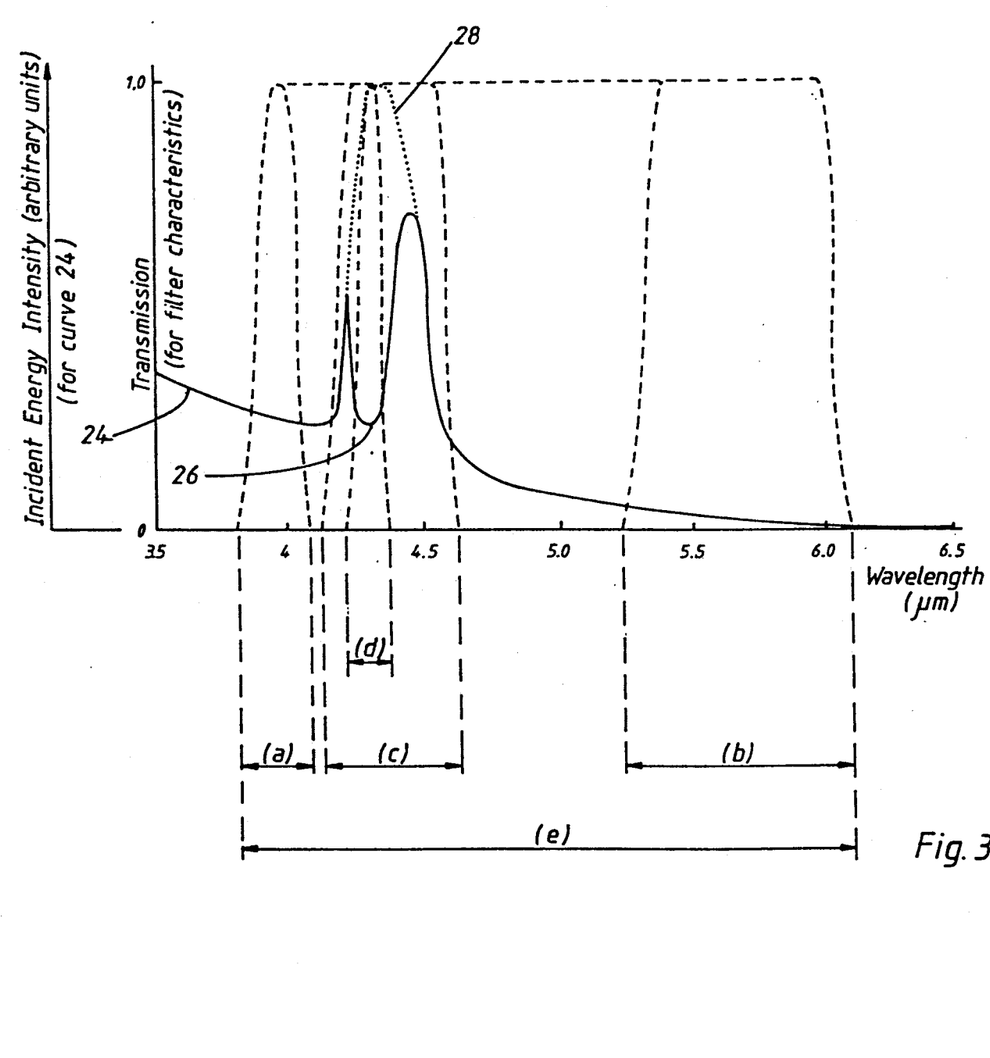
FIG. 3 shows a graph explanatory of the operation of certain components of the arrangement of FIG. 1, FIGS. 4a and 4b show, in plan and cross-sectional views respectively, a thermal detector device suitable for use in the arrangement of FIG. 1.

In this particular example, the five optical filters are chosen so as to be particularly sensitive to infra-red energy consistent with the generation of significant amounts of carbon dioxide ($CO_2$). This renders it necessary to discriminate against distant $CO_2$ sources, which can be characterised by the present of a trough in the intensity-versus-wavelength curve occasioned by the known phenomenon of atmospheric absorption. Thus, regarding the nature of the $CO_2$ spectrum, as shown by plot 24 in FIG. 3, and containing a trough 26 previously mentioned in what (for a close and intense source of radiation) would be a continuous peak region 28, the five optical filters are each chosen to exhibit one of the following pass bands, as shown in FIG. 3:

(a) wholly below the peak region 28;
(b) wholly above the peak region 28;
(c) substantially coincident with the whole peak region 28;
(d) substantially coincident with the trough 26; and
(e) spanning all of the foregoing bands.

Electrical signals derived from the various thermal detector devices 6 and influenced by optical filters having the passband characteristics as outlined above can be processed to detect with reliability the incidence of a close and intense fire based on $CO_2$ emission.

Figure 4A:
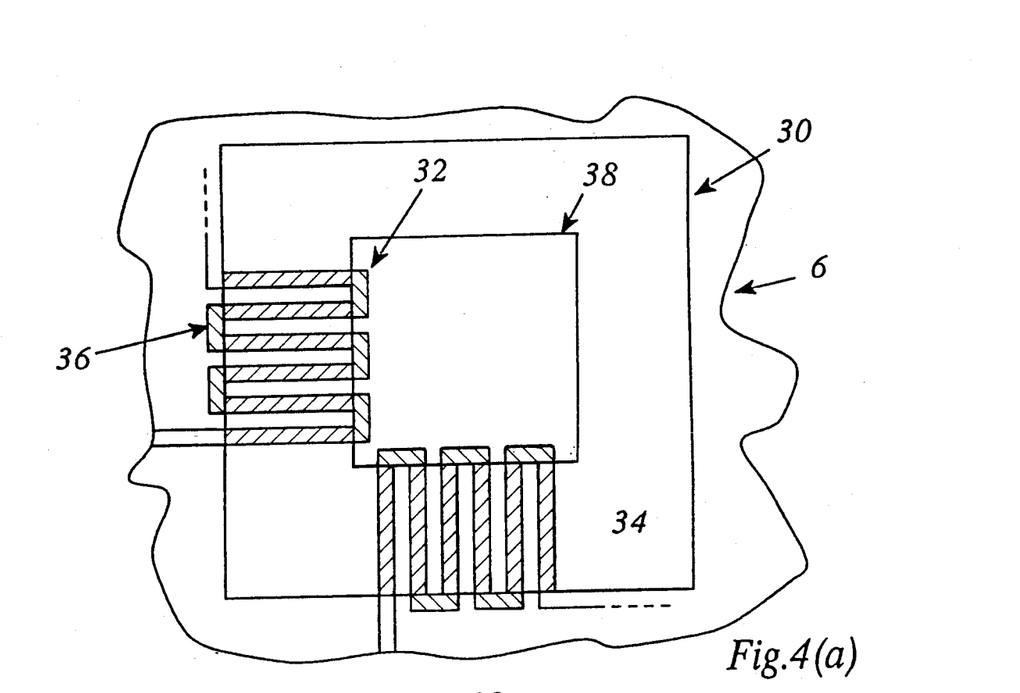
Figure 4B:
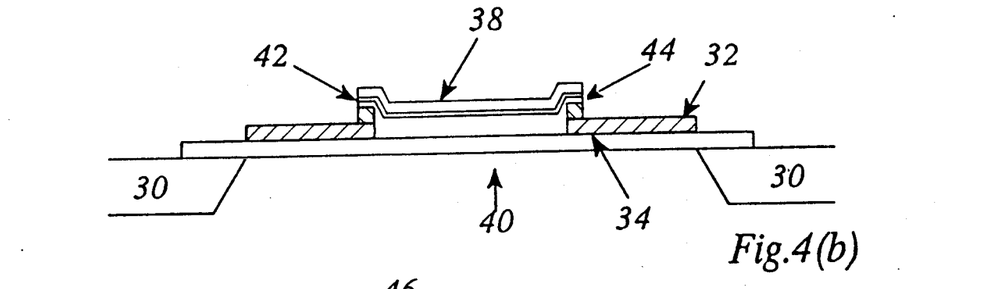

The respective thermal detector devices 6 are conveniently manufactured as thermopile devices using micro-fabrication techniques on a semiconductor substrate 30, such as a silicon substrate as shown in FIG. 4a. Using this type of fabrication, thermopiles with short thermal time constant, high responsivity, and low fabrication cost can be achieved. The short time constant and high responsivity are achieved by fabricating the thermopiles 6 with a hot junction 32 on a thermally isolating membrane 34, and a cold junction 36 on the substrate 30, which acts as a heat sink. The incident radiation can be absorbed by an absorber 38 in the form of a deposited layer, such as platinum black, or a quarter wave absorber, in which case the membrane 34 itself can act as an optical cavity.

The signals generated by the thermopiles 6 are multiplexed in multiplexer 16 and amplified using a variable gain amplifier with, desirably, gains of up to 100 dB. The voltage offsets of the amplifier which would normally saturate the amplifiers at the higher gains are reduced to less than the resolution of the analogue to digital converter (ADC) 12 using a commutated offset adjust system. It will be recalled that one of the optical filters 4 has a pass band encompassing all of the others and the thermopile signals are scaled by using the signal obtained from the thermopile associated with this wide band optical filter to set the gain of the amplifier. The amplified signal is digitised using the analogue-to-digital converter 12.

The error introduced by the temporal multiplexing of the thermopiles in the multiplexer 16 can be rendered sufficiently small as to be acceptable either by interrogating all thermopiles in a period much less than the time constant of the thermopiles, or by interpolation of the individual signals to obtain an estimate of the signals at the same interrogation instant. The relative signals of the thermopiles are then compared with sample data held in non-volatile memory within the processor 14 to generate the detection decision.

Discrimination against possible sources of false alarm can, as mentioned previously, be influenced by appropriate choice for the optical filters 4 and logic circuits within the processor 14 used to generate the detection decision.

The main performance requirements of each thermopile 6 are a short thermal time constant, typically of the order of 10 milliseconds, and a high signal to noise ration (SNR). In order to obtain a high SNR, high responsivity (i.e. output response per unit input stimulus) coupled with low inherent noise is required. To obtain maximum responsivity, there needs to be good thermal isolation between the hot 32 and cold 36 junctions of the thermopiles. One way of producing the isolation is to fabricate the thermopiles on the membrane 34 deposited onto the silicon substrate 30, with a hole 40 subsequently etched into the substrate 30 so that contact between the membrane and the substrate is restricted to an edge portion of the membrane, as shown in FIGS. 4a and 4b. A square membrane is achieved when an anisotropic etch solution is used to etch the hole 40. The absorber 38 which is required to absorb the incident radiation is in this case electroplated platinum black which necessitates the use of a plating base 42, and a dielectric layer 44 to stop the absorber 38 acting as an electrical short between the elements of the thermopile.

Figure 5:
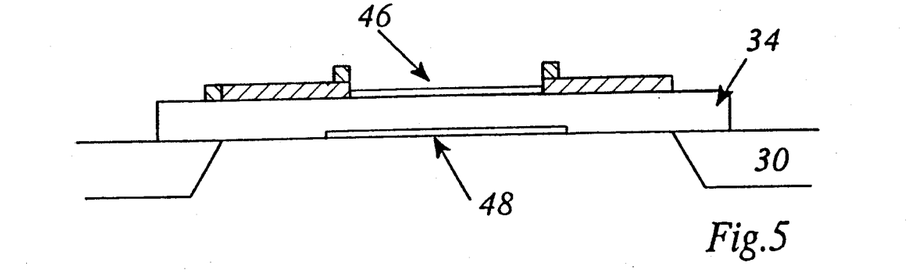
FIG. 5 shows, in cross-sectional view, an alternative configuration for the thermal detector device.

An alternative method for absorbing the incident radiation is to use the membrane 34 itself as a quarter wave absorber as shown in FIG. 5. The absorbing cavity is formed between a resistive nichrome film 46 which is impedence matched to free space with a resitivity of 377$\Omega$ per square, and a reflector 48 which may comprise titanium or gold. The thickness of the optical cavity so provided, $t_c$, is given by the expression $$t_c = \lambda/4n$$

where n is the refractive index of the dielectric used in the membrane 34 and λ is the wavelength of the radiation to be absorbed.

The main requirements of the electronic components for processing the signals from the thermopiles 6 are to have a wide dynamic range with gain up to 100 dB, low noise, and low voltage offset. The thermopile signals are multiplexed by multiplexer 16 into a single amplifier chain to keep the size and cost of the detector to a minimum. Ideally, all thermopiles 6 would be sampled simultaneously to achieve an accurate representation of the spectral characteristic of the radiation incident on the device. This is not possible with the small signals derived from the thermopiles 6 due to the imperfections in any practical implementation of a sample-and-hold circuit. The sequential interrogation of the thermopiles which would be used in practice to achieve such simultaneous sampling, will thus result in a temporal error. This can be minimised by either interpolating between actual samples so as to create synthetically simultaneous samples or by interrogating the thermopiles sufficiently rapidly to render the error negligible. The latter course is preferred since the former would result in an unacceptable use of processing time. A multiplexing frequency of 10 kHz is acceptable for thermopiles designed for a time constant of 10 msecs. However, the multiplexing frequency determines the minimum frequency bandwidth of the amplifier. The bandwidth needs to be minimised to reduce the noise inherent in the circuit, and thus reduce the minimum detactable signal. Hence, a bandwidth of 20 kHz may typically be used with a multiplexing frequency of 10 kHz.

Figure 6:
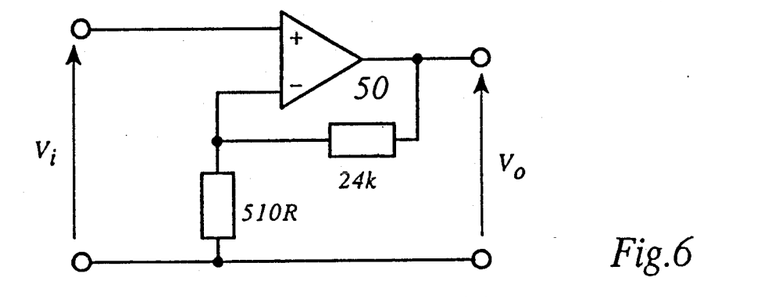
FIGS. 6, 7 and 8 show respective electrical circuit arrangements suitable for operating on signals derived from thermal detector devices of the kinds shown in FIGS. 4a and 4b or 5.

To keep the performance limiting components in the processing circuitry to a minimum, the first amplifier stage is designed to keep noise to a minimum whilst having sufficient gain to ensure that noise due to subsequent amplifiers can be neglected. The first stage amplifier is a simple non-inverting amplifier 50 as shown in FIG. 6. By use of an OP27 operational amplifier the equivalent noise resistance of the circuit may be kept to around 540Ω.

Figure 7:
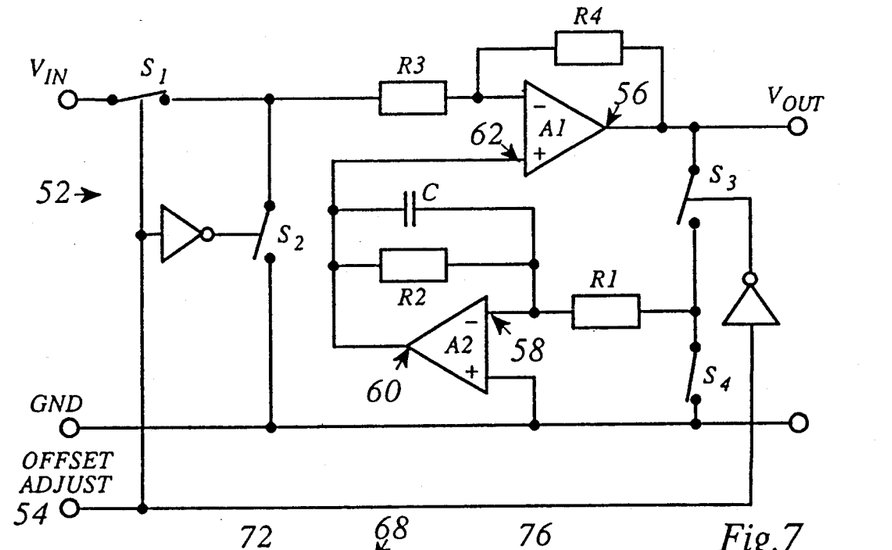

It will be appreciated that the voltage offset at the output of the operating circuits 10 needs to be less than the resolution of the analogue-to-digital converter (ADC) 12 if no data is to be lost. For an 8-bit ADC with a full-scale voltage of 2.5 V, the offset voltage of the amplifier chain of the operating circuits 10 is required to be less than 10 mV. Referred to the input with a gain requirement of 100 dB this would ordinarily require a first stage amplifier with a voltage offset of 0.1 μV. However, no economic commercially available amplifier has such a low voltage offset. Compensation could be made to the circuit on its assembly but, as will be realised by persons skilled in this art, this would not be sufficient because of the variation of offset voltages with operating temperature. The voltage offset thus needs to be regularly compensated during operation of the device. This is achieved using a commutated offset adjust circuit 52, such as shown in FIG. 7.

The commutated offset adjust circuit 52 operates by periodically adjusting the potential at the non-inverting input of the inverting amplifier such that the output potential is effectively zero. The adjust circuit 52 has two main parts, the inverting amplifier based around amplifier $A_1$ with a gain of $-R_4/R_3$, and an integrating circuit based around amplifier $A_2$.

By selecting the appropriate amplifier for amplifier $A_1$, and choosing suitable values for resistors $R_3$ and $R_4$ such that their parallel impedance is around 1 kΩ or less, the current contribution can be neglected. The offset adjust cycle is started by setting "OFFSET ADJUST" line 54 high, thus closing switches $S_2$ and $S_3$ and opening switches $S_1$ and $S_4$, and connecting output 56 of the inverting amplifier $A_1$ to input 58 of the integrator amplifier $A_2$. The potential at output 60 of the integrator would rise with the time constant of the integrator (determined by $R_1C$) for a fixed input of the opposite sense. This potential at the output 60 becomes the bias potential at the non-inverting input 62 of amplifier $A_1$ completing a negative feedback loop. Thus the output of the amplifier $A_1$ always tends to zero whenever the integrator circuit $A_2$ is switched in. When the "OFFSET ADJUST" line 54 is returned low, the bias potential at the non-inverting input 62 is held by the integrator since both its inputs are at ground potential. In practice a small amount of droop is manifest on the bias potential because of discharge in stabilising resistor, $R_2$, and the bias current of the amplifier $A_1$. For the best operation of this circuit, the discharging time constant is required to be large relative to the period of "OFFSET ADJUST" signal. In practice, the output voltage offset equals the input voltage offset of the amplifier $A_2$ (again neglecting current offsets) since the circuit will adjust until there is no apparent potential between the two inputs of the integrator $A_2$. For best results the ground reference to which the circuit is adjusted is taken from the "blind" thermopile channel to ensure that circuit offsets occurring prior to the integrator $A_2$ are negated.

Figure 8:
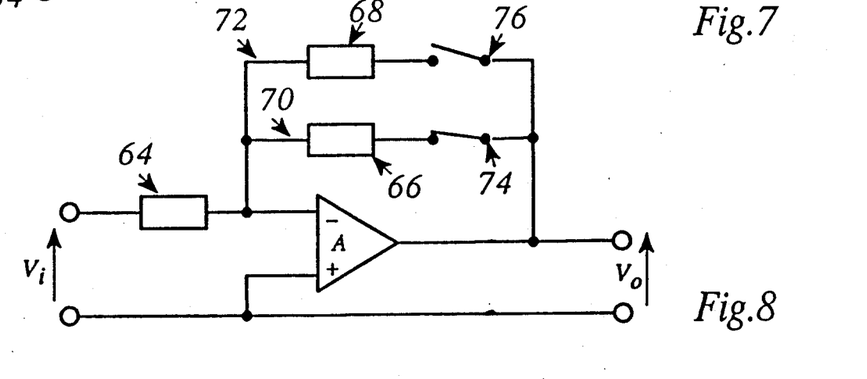

The wide dynamic range of input signal needs to be "compressed" for subsequent conversion to the digital domain. This is preferably achieved by means of a variable gain amplifier, based around circuit 64 shown in FIG. 8. The gain is selected using analogue switches controlled in response to the processing activity. The choice of gain is based on the measured signal from the thermopile associated with the wide bandpass optical filter which as will be realised, will exceed the sum of the signals of the narrower bandpass optical filters. This measurement is taken using the minimum gain setting. The circuit 64 has three different gain settings controlled by selectively switching resistors 66,68 in feedback paths 70,72 by means of switches 74,76. However, only two gain settings are used since the third gain, selected when switches 74,76 are both closed, will be very close to the lower gain. Further gain configurations can be added either by adding more feedback paths to the circuit shown, or by adding further amplifier stages of the same type. Multiple amplifier stages are preferably used so that the required gain-bandwidth product of any single amplifier is kept to a minimum.

The bandwidth of the processing circuit 10 can be limited to 20 kHz either by using an additional filter stage, or by incorporating the filtering within the feedback loops of the existing amplifiers. An additional filter stage is preferred as it allows more flexibility in filter design. A Butterworth filter can be incorporated within the existing amplifiers with a total number of poles equal to the number of amplifiers with filters incorporated.

The signal can be digitised by any ADC 12 capable of conversion within 10 μsecs. A longer conversion time should not be used since the bandwidth of the amplifier is 20 kHz, and the multiplexed signal needs to settle. Any subsequent signal processing is carried out in software, such as a system based on a Z80 microprocessor.

Figure 9:
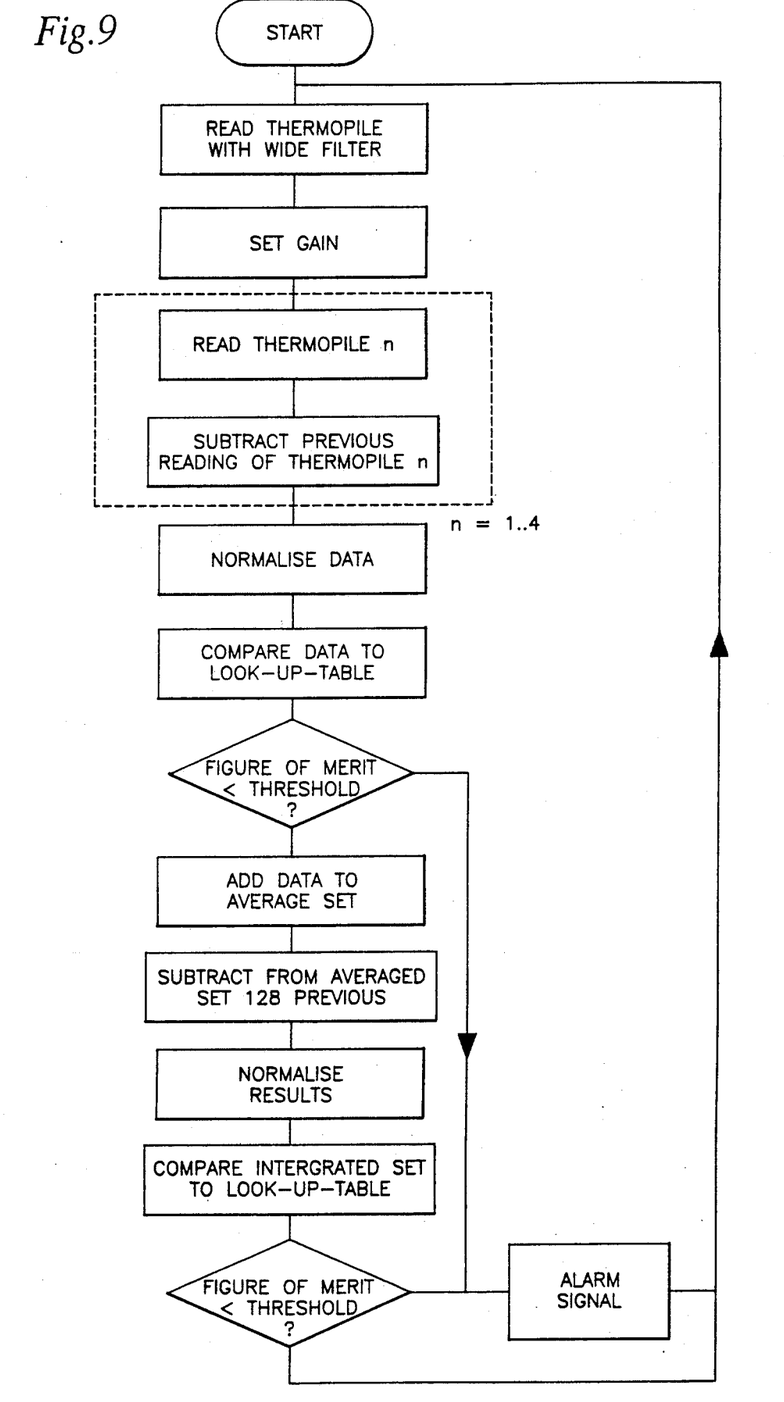
FIG. 9 shows, in flow diagrammatic form, a processing operation that can be applied to signals delivered by the operating circuits of FIGS. 6, 7 and 8.

The signals are processed with two main objectives, namely (a) fast detection of fires based on two samples of each thermopile and (b) slower detection of fires using 128 samples of each thermopile. The slower detection allows smaller fires to be detected since the noise levels are effectively reduced by the root of the number of samples. A suitable flow diagram to illustrate the process by steps taken is shown in FIG. 9. The process steps shown in FIG. 9 will not be described in the present application as they are considered to be understood by persons skilled in this art. The process typically cycles in 5 msecs on a Z80 based system with a 2.5 MHz clock rate. If the faster algorithm is used on its own, a cycle time, and thus detection time, of 2 msec can be achieved.

Although the present invention has been described with respect to specific embodiments, it is to be understood that modifications may be effected within the scope of the present invention. For example, other forms of thermal detector device may be employed and alternative signal processing arrangements will be readily apparent to persons skilled in this art.

We claim:

1. A thermal detector arrangement comprising a plurality of optical filter devices each having a respective passband characteristic for transmitting radiation having a wavelength indicative of a characteristic of a fire to be detected, a further optical filter device having a passband characteristic spanning the passband characteristics of the plurality of optical filter devices, a plurality of thermal detector devices, each for receiving radiation transmitted by a respective optical filter device and for providing therefrom an output signal indicative of the radiation transmitted by the optical filter device, a multiplexer circuit for multiplexing the output signals from the thermal detector devices, and signal processing means for processing the multiplexed output signals and for providing therefrom an indication of a fire to be detected.

2. A thermal detector according to claim 1 comprising a plurality of collimators for collimating the radiation to be received by the optical filter devices.

3. A thermal detector according to claim 2 wherein the collimators each comprise a cavity of frustro-conical shape.

4. A thermal detector according to claim 2 wherein the collimators each comprise a cavity of compound parabolic configuration.

5. A thermal detector according to claim 1 wherein the thermal detector devices each comprise a silicon substrate having an aperture therein, a thermally isolating membrane supported by the substrate and arranged over the aperture, an absorber supported by the membrane, a hot junction in contact with the absorber and a cold junction in contact with the silicon substrate.

6. A thermal detector according to claim 2 wherein the thermal detector devices each comprise a silicon substrate having an aperture therein, a thermally isolating membrane supported by the substrate and arranged over the aperture, an absorber supported by the membrane, a hot junction in contact with the absorber and a cold junction in contact with the silicon substrate.

7. A thermal detector according to claim 1 wherein the thermal detector devices each comprise a silicon substrate having an aperture therein, a thermally isolating membrane supported by thesubstrate, the membrane having a resistive film on one major surface thereof arranged incident to the radiation and a reflector layer on the opposite major surface thereby to provide a radiation absorbent cavity in the membrane.

8. A thermal detector according to claim 2 wherein the thermal detector devices each comprise a silicon substrate having an aperture therein, a thermally isolating membrane supported by the substrate, the membrane having a resistive film on one major surface thereof arranged incident to the radiation and a reflector layer on the opposite major surface thereby to provide a radiation absorbent cavity in the membrane.

9. A thermal detector according to claim 7 wherein the reflector layer comprises gold.

10. A thermal detector according to claim 1 wherein the signal processing means comprises an amplifier circuit for amplifying the multiplexed output signals from the thermal detector devices, the signal processing means including an offset adjust circuit for compensating voltage offset of the amplifier circuit.

11. A thermal detector according to claim 2 wherein the signal processing means comprises an amplifier circuit for amplifying the multiplexed output signals from the thermal detector devices, the signal processing means including an offset adjust circuit for compensating voltage offset of the amplifier circuit.

12. A thermal detector according to claim 5 wherein the signal processing means comprises an amplifier circuit for amplifying the multiplexed output signals from the thermal detector devices, the signal processing means including an offset adjust circuit for compensating voltage offset of the amplifier circuit.

13. A thermal detector according to claim 7 wherein the signal processing means comprises amplifier circuit for amplifying the multiplexed output signals from the thermal detector devices, the signal processing means including an offset adjust circuit for compensating voltage offset of the amplifier circuit.

14. A thermal detector according to claim 10 wherein the offset adjust circuit comprises an inverting amplifier circuit and an integrating circuit arranged in a feedback loop to the inverting amplifier circuit.

15. A thermal detector according to claim 13 wherein the offset adjust circuit comprises an inverting amplifier circuit and an integrating circuit arranged in a feedback loop to the inverting amplifier circuit.

16. A thermal detector according to claim 1 wherein the signal processing means comprises a variable gain amplifier circuit, arranged to receive the output signal from the thermal detector device respective to the further optical filter device, having a gain controlled in dependence upon the level of the output signal from the thermal detector respective to the further optical filter device.

17. A thermal detector according to claim 7 wherein the signal processing means comprises a variable gain amplifier circuit, arranged to receive the output signal from the thermal detector device respective to the further optical filter device having a gain controlled in dependence upon the level of the output signal from the thermal detector respective to the further optical filter device.

18. A thermal detector according to claim 10 wherein the signal processing means comprises a variable gain amplifier circuit, arranged to receive the output signal from the thermal detector device respective to the further optical filter device having a gain controlled in dependence upon the level of the output signal from the thermal detector respective to the further optical filter device.

19. A thermal detector according to claim 1 wherein the signal processing means comprises an analogue to digital converter for digitising the multiplexed output signals.

20. A thermal detector according to claim 19 comprising processor means for receiving multiplexed digital output signals from the analogue to digital converter and sampling means for sampling the multiplexed digital output signals derived from the output signals of the thermal detector devices a plurality of times for providing the indication of a fire to be detected.

* * * * *